(12) United States Patent
Satou et al.

(10) Patent No.: US 12,467,906 B2
(45) Date of Patent: Nov. 11, 2025

(54) PHYSICAL QUANTITY MEASUREMENT DEVICE

(71) Applicant: Panasonic Intellectual Property Management Co., Ltd., Osaka (JP)

(72) Inventors: Masato Satou, Nara (JP); Motoyuki Nawa, Nara (JP); Asako Miyoshi, Kyoto (JP); Masataka Matsuda, Kyoto (JP); Yuuji Nakabayashi, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 418 days.

(21) Appl. No.: 18/012,537

(22) PCT Filed: Jul. 9, 2021

(86) PCT No.: PCT/JP2021/025984
§ 371 (c)(1),
(2) Date: Dec. 22, 2022

(87) PCT Pub. No.: WO2022/014499
PCT Pub. Date: Jan. 20, 2022

(65) Prior Publication Data
US 2023/0273156 A1    Aug. 31, 2023

(30) Foreign Application Priority Data

Jul. 16, 2020  (JP) .................................. 2020-121785
Jul. 16, 2020  (JP) .................................. 2020-121786

(51) Int. Cl.
*G01N 29/22*    (2006.01)
*G01F 1/667*    (2022.01)
(Continued)

(52) U.S. Cl.
CPC ............ *G01N 29/222* (2013.01); *G01F 1/667* (2013.01); *G01F 5/00* (2013.01); *G01K 13/02* (2013.01);
(Continued)

(58) Field of Classification Search
CPC .... G01N 29/024; G01N 29/22; G01N 29/222; G01N 29/223; G01N 29/326;
(Continued)

(56) References Cited

U.S. PATENT DOCUMENTS

2022/0299480 A1    9/2022  Xiong et al.

FOREIGN PATENT DOCUMENTS

| CN | 110988115   |   | 4/2020 |            |
|----|-------------|---|--------|------------|
| CN | 110988115 A | * | 4/2020 | A61M 16/0816 |

(Continued)

OTHER PUBLICATIONS

Extended European Search Report issued Nov. 24, 2023 in corresponding European Patent Application No. 21841969.5.
(Continued)

*Primary Examiner* — Benjamin R Schmitt
(74) *Attorney, Agent, or Firm* — WENDEROTH, LIND & PONACK L.L.P.

(57) ABSTRACT

A physical quantity measurement device is provided which is capable of measuring a component in a fluid to be measured even when the fluid contains droplets such as fine water droplets. The physical quantity measurement device includes, at an inlet opening (5) of a sub-channel (7), an inflow direction regulator (13) which includes guide pieces (12) each of which is inclined at predetermined angle θ with respect to the flow direction in a main channel (1). The angle θ of inflow direction regulator (13) is set to a value that is greater than 90 degrees in relation to the flow direction of the main channel (1).

5 Claims, 8 Drawing Sheets

(51) Int. Cl.
    *G01F 5/00*      (2006.01)
    *G01K 13/02*     (2021.01)
    *G01N 29/024*    (2006.01)
    *G01N 29/32*     (2006.01)

(52) U.S. Cl.
    CPC ......... *G01N 29/024* (2013.01); *G01N 29/326* (2013.01); *G01N 2291/011* (2013.01); *G01N 2291/02809* (2013.01); *G01N 2291/02836* (2013.01); *G01N 2291/102* (2013.01)

(58) Field of Classification Search
    CPC ... G01N 2291/011; G01N 2291/02809; G01N 2291/02836; G01N 2291/102; G01F 1/667; G01F 5/00; G01K 13/02
    See application file for complete search history.

(56) References Cited

FOREIGN PATENT DOCUMENTS

| | | | |
|---|---|---|---|
| DE | 10 2004 021 303 | 11/2005 | |
| DE | 102005062627 A1 * | 7/2007 | ............... G01F 1/06 |
| WO | 00/45163 | 8/2000 | |
| WO | 2018/185034 | 10/2018 | |

OTHER PUBLICATIONS

International Search Report issued Sep. 21, 2021 in corresponding International Application No. PCT/JP2021/025984.

Office Action issued Jun. 30, 2025 in corresponding Chinese Patent Application No. 202180048961.8, with partial English language translation.

* cited by examiner

PHYSICAL QUANTITY MEASUREMENT DEVICE

TECHNICAL FIELD

The present disclosure relates to a physical quantity measurement device which samples part of flowing fluid that is used and measures a physical quantity, such as the concentration, of a component contained in the fluid.

BACKGROUND ART

As a measurement device which measures a fluid component according to a conventional technique, an ultrasonic flowmeter is known which includes a flow rate measurement unit and a component measurement unit which is disposed next to the flow rate measurement unit and which samples fluid flowing through the flow rate measurement unit (for example, Patent Literature (PTL) 1).

FIG. 8 is a partial cross-sectional view illustrating a configuration of a measurement channel of a component measurement unit included in an ultrasonic flowmeter according to a conventional technique.

In this flowmeter, main channel 101 of measurement channel 100 is divided into multiple layers by partition plates 102 to form multilayer channel 103. Sub-channel 104 for measuring the fluid component is disposed next to multilayer channel 103. In order to cause the fluid flowing through main channel 101 to flow into sub-channel 104, protruding portion 105 protruding to main channel 101 is disposed on the inlet side of multilayer channel 103, and the cross section of the channel is partially reduced in size. Sub-channel 104 is formed such that the ejector effect generated by the above structure draws the fluid through outlet port 106 on the upstream side of multilayer channel 103a to cause the fluid to flow in through an inlet port (not illustrated).

Subsequently, a gas component is measured by infrared light in this sub-channel 104.

CITATION LIST

Patent Literature

[PTL 1] International Application Publication No. WO2018/185034

SUMMARY OF THE INVENTION

However, in the configuration according to the conventional technique, in cases where the fluid flowing through main channel 101 contains droplets such as fine water droplets when the fluid in main channel 101 is drawn to sub-channel 104 for measuring the fluid component, the droplets enter sub-channel 104, which adversely influences the component measurement. Moreover, in order to exert the ejector effect, pressure loss is generated which influences the fluid flowing through main channel 101. However, when the pressure loss is reduced, there is a problem that a sufficient suction force to cause the fluid to flow into sub-channel 104 cannot be obtained.

The present disclosure is capable of providing a measurement device which significantly reduces entrance of droplets such as water droplets into a sub-channel for measuring characteristics, such as the concentration, of a component contained in the fluid and also accurately measures the concentration of the component contained in the fluid in the sub-channel while reducing the turbulence of the fluid flow generated in the main channel.

A physical quantity measurement device according to the present disclosure includes: a main channel through which a fluid to be measured flows; an inlet opening and an outlet opening which are provided in a channel wall of the main channel; a sub-channel which connects the inlet opening and the outlet opening; an inflow direction regulator which is disposed at the inlet opening; a chamber portion which is disposed in the sub-channel; a pair of ultrasonic transmitter and receiver which are disposed in the chamber portion; a temperature sensor which detects a temperature of the fluid; and a signal processor which calculates a concentration of a component contained in the fluid in response to a signal from the pair of ultrasonic transmitter and receiver and a signal from the temperature sensor. The inflow direction regulator includes a guide piece which is inclined at a predetermined angle with respect to a flow direction of the fluid in the main channel. The predetermined angle is set to a value that is greater than 90 degrees in relation to the flow direction of the fluid in the main channel. The chamber portion has a cross-sectional area that is greater than an effective cross-sectional area of the inlet opening. Even when the fluid to be measured contains droplets such as fine water droplets, the physical quantity measurement device thus configured is capable of supplying, to the sub-channel, fluid in which the mixture of droplets such as water droplets is significantly reduced and which contains substantially no droplets. With this, it is possible to significantly reduce the influence of droplets and the like, and to increase the accuracy of measurement such as the concentration measurement of a component contained in the fluid. Moreover, since in the chamber portion disposed in the sub-channel, the inflow velocity of the fluid can be reduced, the disturbance of the fluid generated in the main channel can be reduced. With this, it is possible to measure, in the sub-channel, the fluid to be measured in a state where the disturbance of the fluid flow is small. Moreover, the main channel of the physical quantity measurement device has a cross-sectional area that is not reduced in the portion where the fluid flowing through the main channel is led to the sub-channel. Hence, no particular pressure loss is generated in the fluid flowing through the main channel.

Moreover, a physical quantity measurement device according to the present disclosure includes: a main channel through which a fluid to be measured flows; an inlet opening and an outlet opening which are provided in a channel wall of the main channel; a sub-channel which connects the inlet opening and the outlet opening; an inflow direction regulator which is disposed at the inlet opening; and a component concentration measurement unit which is disposed in the sub-channel. The inflow direction regulator includes a plurality of guide pieces each of which is inclined at a predetermined angle with respect to a flow direction of the fluid in the main channel. The predetermined angle is set to a value that is greater than 90 degrees in relation to the flow direction of the fluid in the main channel, and a relation between a distance h and a height H satisfies H>h where the distance h is a distance between adjacent ones of the plurality of guide pieces and the height H is a height of the main channel. Even when the fluid to be measured contains droplets such as fine water droplets, the physical quantity measurement device thus configured is capable of supplying, to the sub-channel, fluid in which the mixture of droplets such as water droplets is significantly reduced and which contains substantially no droplets. With this, it is possible to significantly reduce the influence of droplets and the like, and to increase the accuracy of measurement such as the concentration measurement of a component contained in the fluid. Moreover, by dividing the flow of the fluid by louver-shaped guide pieces, it is possible to reduce the disturbance of the flow of the fluid generated in the main channel. With this, it is possible to measure, in the sub-channel, the fluid to be measured in a state where the disturbance of the fluid flow is small. Moreover, the main channel of the physical quantity measurement device has a cross-sectional area that is not reduced in the portion where the fluid flowing through the main channel is led to the sub-channel. Hence, no particular pressure loss is generated in the fluid flowing through the main channel.

The physical quantity measurement device according to the present disclosure includes an inflow direction regulator which is disposed at the inlet opening. The inflow direction regulator includes guide pieces each of which is inclined at a predetermined angle with respect to the flow direction of the fluid in the main channel. The predetermined angle is set to a value that is greater than 90 degrees in relation to the flow direction of the fluid in the main channel. Even when the fluid to be measured contains droplets such as fine water droplets, the physical quantity measurement device thus configured is capable of supplying, to the sub-channel, fluid in which the mixture of droplets such as water droplets is significantly reduced and which contains substantially no droplets. With this, it is possible to significantly reduce the influence of droplets and the like, and to increase the accuracy of measurement such as the concentration measurement of a component contained in the fluid. Moreover, since the inflow velocity of the fluid can be reduced in the chamber portion disposed in the sub-channel, the disturbance of the fluid generated in the main channel can be reduced. With this, it is possible to measure, in the sub-channel, the fluid to be measured in a state where the disturbance of the fluid flow is small. Moreover, the cross-sectional area of the main channel is not reduced in the portion where the fluid flowing through the main channel is led to the sub-channel. Hence, no particular pressure loss is generated in the fluid flowing through the main channel.

Moreover, by dividing the flow of the fluid by louver-shaped guide pieces, it is possible to reduce the disturbance of the flow of the fluid generated in the main channel. With this, it is possible to measure, in the sub-channel, the fluid to be measured in a state where the disturbance of the fluid flow is small. Moreover, the cross-sectional area of the main channel is not reduced in the portion where the fluid flowing through the main channel is led to the sub-channel. Hence, no particular pressure loss is generated in the fluid flowing through the main channel.

DESCRIPTION OF EMBODIMENTS

Hereinafter, embodiments of the present invention will be described with reference to the drawings.

However, more detailed explanations than necessary may be omitted. For example, detailed explanations of already well-known matters or duplicate explanations for substantially the same configuration may be omitted.

It should be noted that the accompanying drawings and the following description are provided for those skilled in the art to fully understand the present disclosure, and are not intended to limit the subject matter recited in the claims.

First Embodiment

A first embodiment will be described with reference to FIG. 1 and FIG. 2.

Figure 1:
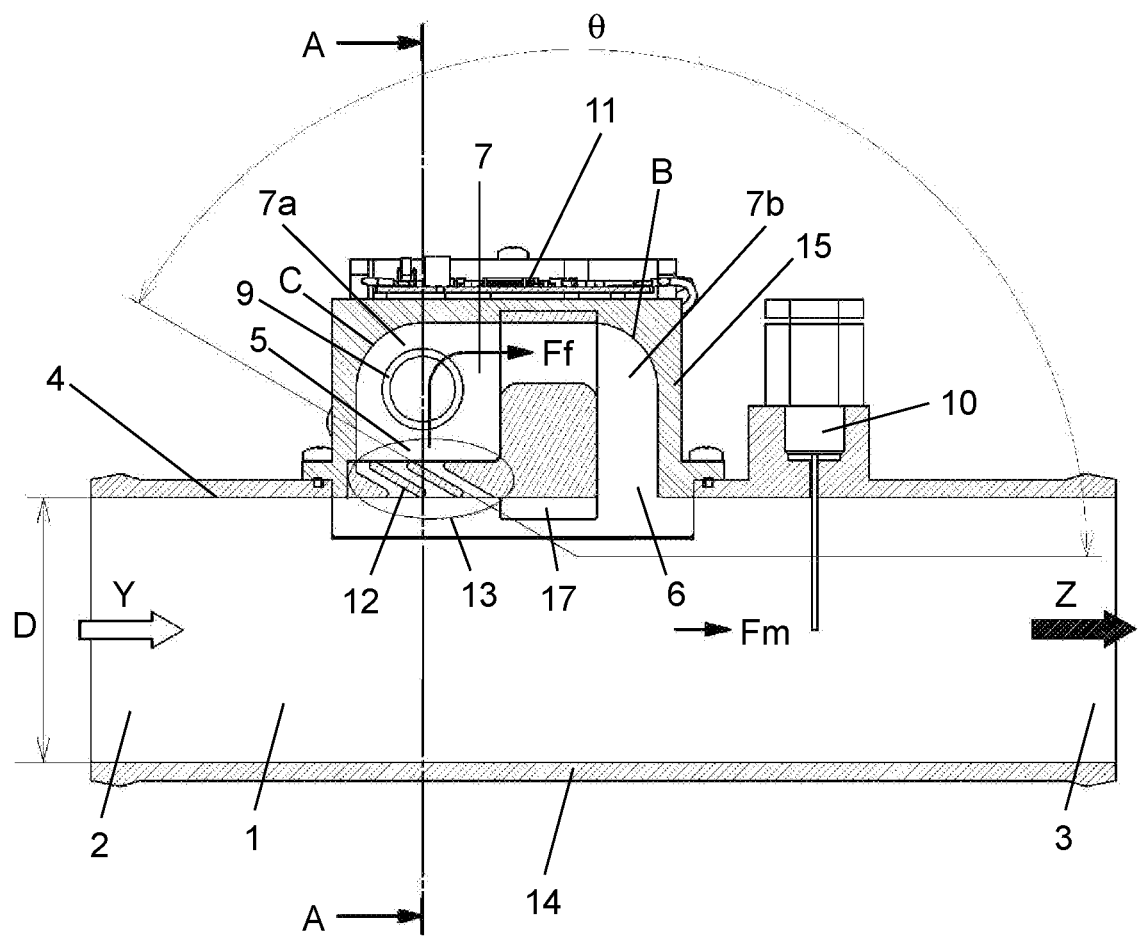
FIG. 1 is a cross-sectional view illustrating an example of a configuration of a physical quantity measurement device according to a first embodiment.

FIG. 1 is a cross-sectional view illustrating an example of a configuration of a physical quantity measurement device according to the first embodiment. FIG. 2 is a cross-sectional view taken along line A-A of FIG. 1.

Figure 2:
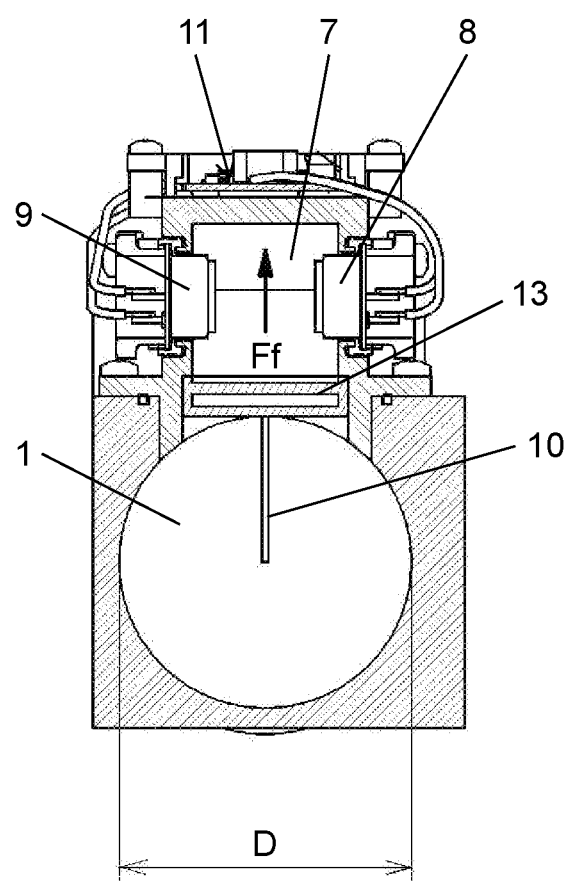
FIG. 2 is a cross-sectional view taken along line A-A of FIG. 1.

In FIG. 1 and FIG. 2, main channel 1 through which fluid to be measured (hereinafter, also simply referred to as "fluid") flows is a circular channel having a cross section with diameter D. Main channel 1 includes inlet 2 and outlet 3.

Channel wall 4 of main channel 1 includes inlet opening 5 on the upstream side, and outlet opening 6 which is provided downstream of inlet opening 5. Sub-channel 7 which connects inlet opening 5 and outlet opening 6 is disposed in parallel with main channel 1. Sub-channel 7 includes chamber portion 7a that is positioned closer to inlet opening 5 and channel portion 7b that is positioned downstream of chamber portion 7a.

A pair of ultrasonic transmitter 8 and receiver 9, which transmit an ultrasonic signal to the fluid to be measured and receive the ultrasonic signal, are disposed in chamber portion 7a of sub-channel 7. Temperature sensor 10 which detects the temperature of the fluid is disposed in main channel 1.

The pair of ultrasonic transmitter 8 and receiver 9 and temperature sensor 10 are electrically connected to signal processor 11 (not illustrated). Signal processor 11 calculates the component concentration of the fluid to be measured in response to the signals from the pair of ultrasonic transmitter 8 and receiver 9 and temperature sensor 10.

Inflow direction regulator 13 is disposed at inlet opening 5 of sub-channel 7. Inflow direction regulator 13 includes a plurality of plate-shaped or louver-shaped guide pieces 12 each of which is inclined at predetermined angle θ with respect to the flow direction of the fluid in main channel 1. Predetermined angle θ of each guide piece 12 is set to a value that is greater than 90 degrees as illustrated in FIG. 1 in relation to the flow direction of the fluid in main channel 1 (that is, from the downstream side to the upstream side of main channel 1).

The pair of ultrasonic transmitter 8 and receiver 9 in sub-channel 7 are arranged so as to oppose to each other in a direction substantially orthogonal to fluid flow Ff in sub-channel 7, and disposed in chamber portion 7a that is positioned on the upstream side of sub-channel 7.

Chamber portion 7a of sub-channel 7 in which ultrasonic transmitter 8 and receiver 9 are disposed has a cross-sectional area that is greater than the substantial cross-sectional area (effective cross-sectional area) of the portion of inlet opening 5 through which the fluid flows.

Inflow direction regulator 13 is arranged so as not to protrude from channel wall 4 to main channel 1. Inner wall surfaces B, C, etc. of the curved portions of sub-channel 7 have corners R (rounding) so as to smooth the fluid flow.

Next, an operation of the physical quantity measurement device according to the present embodiment will be described.

The fluid to be measured flowing through main channel 1 flows in through inlet 2 as indicated by white arrow Y in FIG. 1. Most of the fluid flowing through main channel 1 becomes flow Fm, and finally flows out through outlet 3 as indicated by black arrow Z in FIG. 1.

In inlet opening 5 where inflow direction regulator 13 is disposed, each of plate-shaped or louver-shaped guide pieces 12 of inflow direction regulator 13 is set to have angle θ that is greater than 90 degrees with respect to the flow direction of the fluid in main channel 1. With this, even when the fluid to be measured in main channel 1 contains fine droplets such as water droplets, the water droplets collide with guide pieces 12 and drop or adhere to guide pieces 12, preventing the water droplets from flowing into sub-channel 7.

Flow Ff of the fluid flowing from main channel 1 into sub-channel 7 in such a manner is smoothed by corners R (rounding) disposed at the curved portions, and flows out to main channel 1 through outlet opening 6.

Accordingly, the fluid with a component concentration to be measured in sub-channel 7 enters chamber portion 7a of sub-channel 7 in a state where droplets such as water droplets are substantially removed. In addition, since chamber portion 7a has a cross-sectional area that is greater than the effective cross-sectional area of inlet opening 5, the flow velocity of the fluid passing through guide pieces 12 decreases in chamber portion 7a, so that the turbulence of the flow generated in main channel 1 is reduced.

As described above, droplets, such as water droplets, are substantially removed from the fluid to be measured and the turbulence of the flow is reduced, so that the disturbance of the signal generated when ultrasonic waves are transmitted and received between ultrasonic transmitter 8 and receiver 9 can be reduced. As a result, the sound velocity of the fluid to be measured can be stably measured by using the pair of ultrasonic transmitter 8 and receiver 9. Signal processor 11 calculates the concentration of a component contained in the fluid to be measured by a known method using the sound velocity thus obtained and the temperature of the fluid measured by temperature sensor 10.

Moreover, by arranging the pair of ultrasonic transmitter 8 and receiver 9 so as to oppose to each other in the direction orthogonal to the flow of the fluid to be measured in sub-channel 7, the size of sub-channel 7 can be reduced, leading to downsizing of the physical quantity measurement device.

As described above, in sub-channel 7, it is possible to significantly reduce the mixture of droplets such as water droplets into the fluid to be measured flowing through sub-channel 7, and to achieve a fluid flow state with a small turbulent. Accordingly, the physical quantity measurement device including sub-channel 7 is capable of increasing the accuracy of the measurement, such as the measurement of the concentration of a component contained in the fluid to be measured. Additionally, in this physical quantity measurement device, since the cross section of main channel 1 is not reduced in size, no particular pressure loss is generated in the fluid flowing through main channel 1.

Second Embodiment

A second embodiment will be described with reference to FIG. 3 and FIG. 4.

Figure 3:
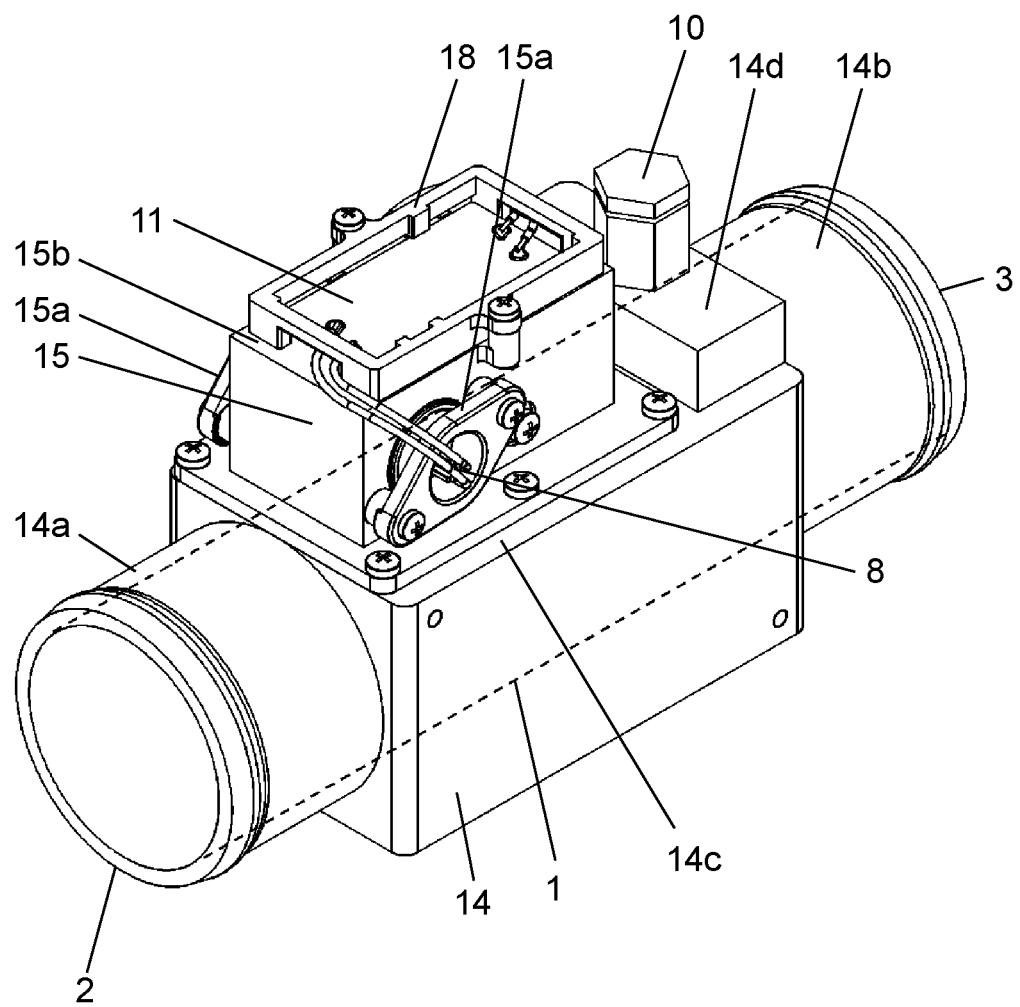
FIG. 3 is an external perspective view illustrating an example of a configuration of a physical quantity measurement device according to a second embodiment.
Figure 4:
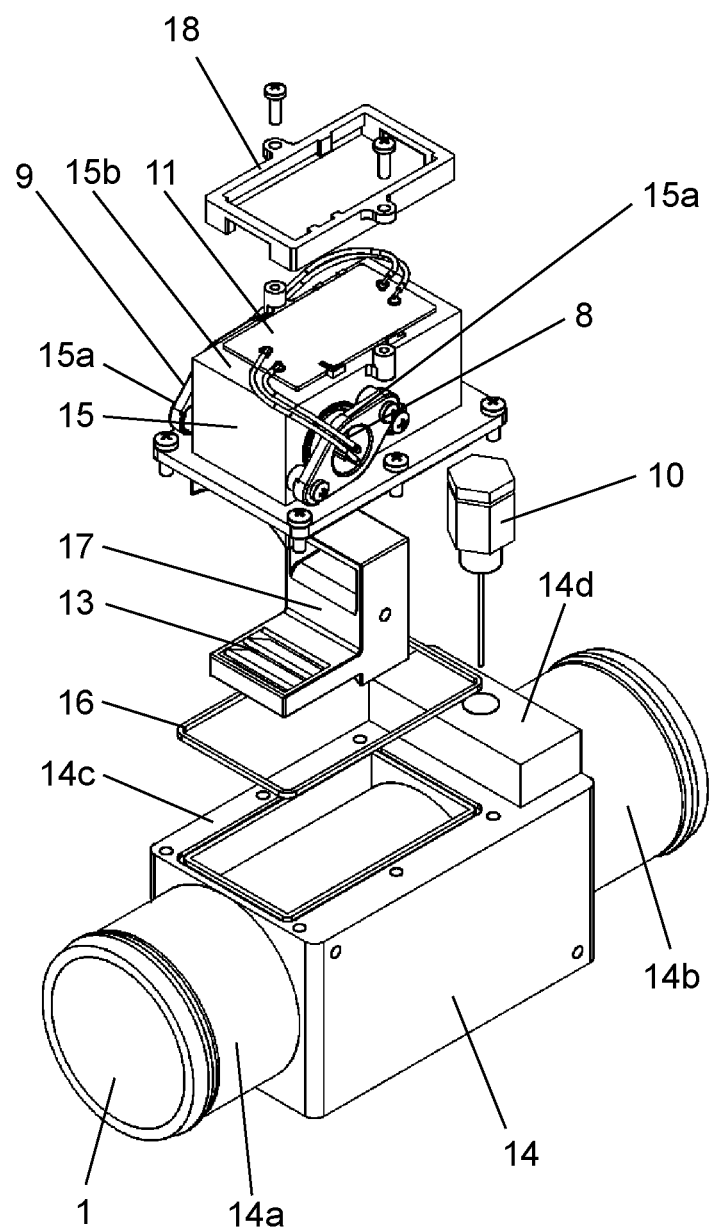
FIG. 4 is an exploded assembly view illustrating an example of structural elements of the physical quantity measurement device according to the second embodiment.

FIG. 3 is an external perspective view illustrating an example of a configuration of a physical quantity measurement device according to the second embodiment. FIG. 4 is an exploded assembly view illustrating an example of structural elements of the physical quantity measurement device illustrated in FIG. 3.

In the present embodiment, the structural elements having the same functions as those in the first embodiment are assigned with the same reference numbers, and the description thereof will be omitted.

Main channel housing block 14 includes main channel 1 which penetrates main channel housing block 14, inlet connector 14a defining inlet 2 of main channel 1, outlet connector 14b defining outlet 3 of main channel 1, sub-channel mounting portion 14c for mounting sub-channel housing block 15, and temperature sensor mounting portion 14d for mounting temperature sensor 10.

Sub-channel housing block 15 includes a pair of ultrasonic transmitter 8 and receiver 9 disposed via an airtight sealing member (not illustrated). Sub-channel 7 is disposed in sub-channel housing block 15. Sub-channel housing block 15 is mounted on sub-channel mounting portion 14c of main channel housing block 14 via packing 16 for airtight sealing. Sub-channel housing block 15 defines the channel shape of sub-channel 7 by housing sub-channel forming block 17 in sub-channel housing block 15. Moreover, sub-channel housing block 15 includes ultrasonic transmitter and receiver mounting portions 15a for mounting ultrasonic transmitter 8 and receiver 9 and signal processor mounting portion 15b for mounting signal processor 11. Inflow direction regulator 13 is integrally formed with sub-channel forming block 17.

Signal processor 11 is disposed on signal processor mounting portion 15b of sub-channel housing block 15, and is fixed to sub-channel housing block 15 with the upper side of signal processor 11 being covered with protection block 18.

Temperature sensor 10 is assembled to temperature sensor mounting portion 14d of main channel housing block 14 via an airtight sealing member (not illustrated) such as an O-ring.

As described above, in the physical quantity measurement device according to the present embodiment, sub-channel housing block 15 which houses sub-channel forming block 17 that is integrally formed with inflow direction regulator 13 is assembled to main channel housing block 14 including main channel 1. With such a configuration of the physical quantity measurement device, the size of the sub-channel can be further reduced, and the productivity at the time of the production of the physical quantity measurement device can be increased by reducing the step of providing, in the main channel, a device for measuring the physical quantity of fluid flowing through the main channel. Moreover, a reduced number of components included in the physical quantity measurement device leads to a cost reduction at the time of producing the physical quantity measurement device.

Although it has been described in the first and second embodiments that the cross-sectional shape of main channel 1 is circular, the physical quantity measurement device according to the present disclosure is not limited to such an example. The cross-sectional shape of main channel 1 may be a shape other than a circle, such as a rectangle. Moreover, although it has been described in the first and second embodiments that temperature sensor 10 is disposed in main channel 1, temperature sensor 10 may be disposed in sub-channel 7.

Moreover, although it has been described in the first and second embodiments that the physical quantity measurement device is a device for measuring a component of the fluid, the physical quantity measurement device according to the present disclosure is not limited to such an example. The physical quantity measurement device according to the present disclosure may be a flowmeter in which a flow rate measurement unit is disposed in series with the upstream side or the downstream side of main channel 1, or a flowmeter in which a flow rate measurement unit is disposed in parallel with main channel 1 including sub-channel 7.

Third Embodiment

A third embodiment will be described with reference to FIG. 5 and FIG. 6. A physical quantity measurement device according to the third embodiment includes substantially the same functions as the physical quantity measurement devices according to the first and second embodiments, but there are some differences. The differences will be described below.

Figure 5:
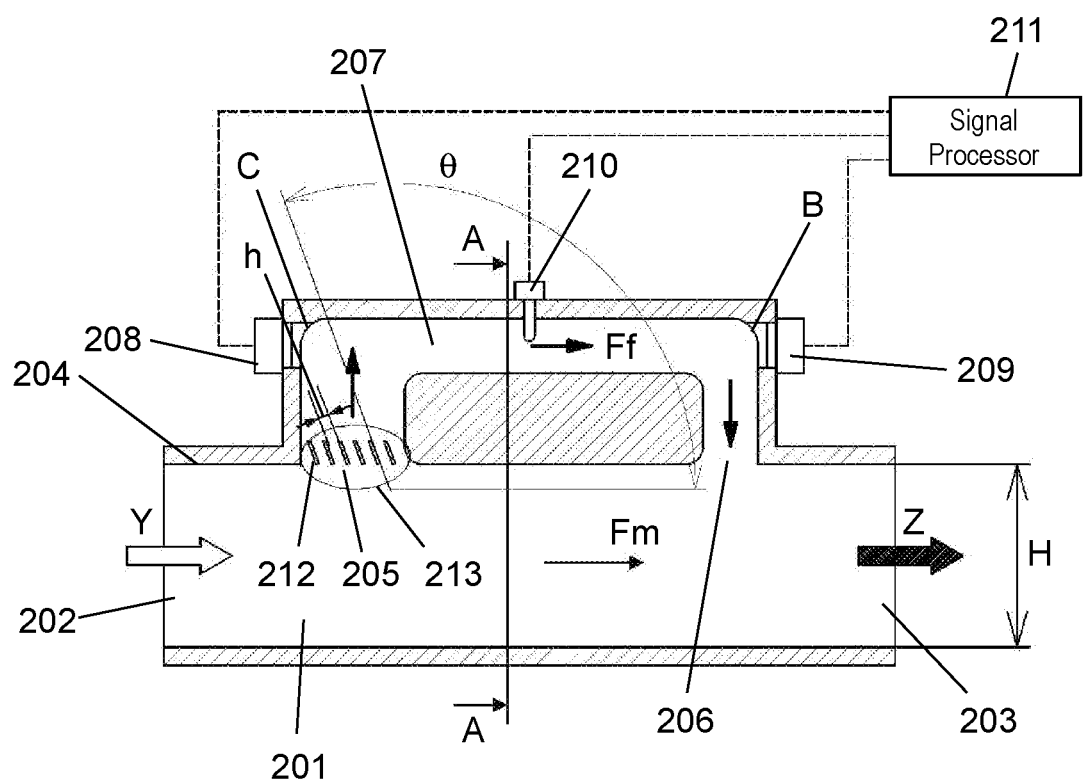
FIG. 5 is a cross-sectional view illustrating an example of a configuration of a physical quantity measurement device according to a third embodiment.

FIG. 5 is a cross-sectional view illustrating an example of a configuration of a physical quantity measurement device according to the third embodiment. FIG. 6 is a cross-sectional view taken along line A-A of FIG. 5.

Figure 6:
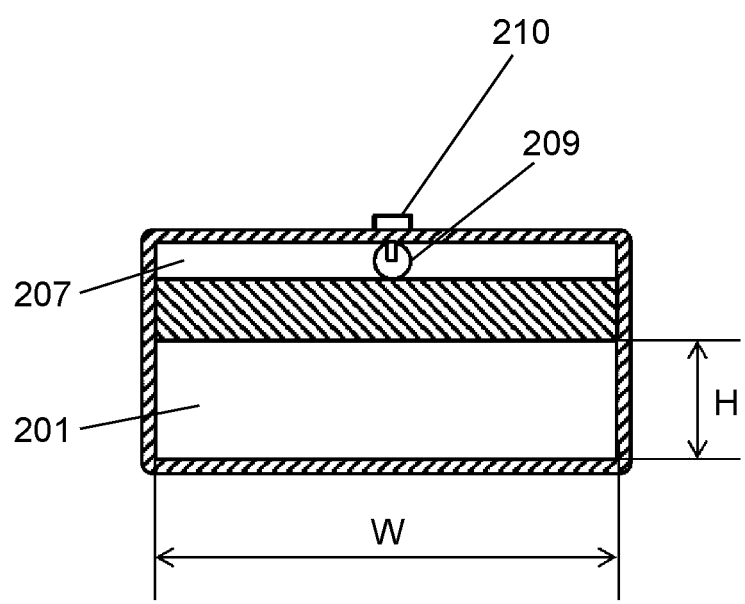
FIG. 6 is a cross-sectional view taken along line A-A of FIG. 5.

In FIG. 5 and FIG. 6, main channel 201 through which fluid to be measured (hereinafter, also simply referred to as "fluid") flows is a rectangular channel that has a cross-sectional shape with a long side that is width W and a short side that is height H. Main channel 201 includes inlet 202 and outlet 203.

Channel wall 204 of main channel 201 includes inlet opening 205 on the upstream side. Outlet opening 206 is provided downstream of inlet opening 205. Sub-channel 207 which connects inlet opening 205 and outlet opening 206 is disposed in parallel with main channel 201. In sub-channel 207, a pair of ultrasonic transmitter 208 and receiver 209 arranged opposing to each other along the fluid flowing direction (that is, on the upstream side and the downstream side), and temperature sensor 210 which detects the temperature of the fluid are disposed.

The pair of ultrasonic transmitter 208 and receiver 209 and temperature sensor 210 are electrically connected to signal processor 211. Signal processor 211 calculates the component concentration of the fluid in response to the signals from the pair of ultrasonic transmitter 208 and receiver 209 and temperature sensor 210.

In the present embodiment, the component concentration measurement unit includes the pair of ultrasonic transmitter 208 and receiver 209, temperature sensor 210, and signal processor 211.

At inlet opening 205 of sub-channel 207, inflow direction regulator 213 is disposed which includes a plurality of plate-shaped or louver-shaped guide pieces 212 each of which is inclined at predetermined angle θ with respect to the flow direction of the fluid in main channel 201. Each guide piece 212 is inclined at angle θ that is set to a value greater than 90 degrees as illustrated in FIG. 5, in relation to the flow direction of the fluid in main channel 201 (that is, from the downstream side to the upstream side of main channel 201).

Guide pieces 212 are configured to satisfy the relation of H>h where h is a distance between adjacent guide pieces 212 and H is a height of main channel 201. Here, distance h between guide pieces 212 and height H of the main channel are values corresponding to the characteristic length of the Reynolds number.

Inflow direction regulator 213 is disposed so as not to protrude from channel wall 204 to main channel 201. Inner wall surfaces B, C, etc. of the curved portions of sub-channel 207 have corners R (rounding) so as to smooth the fluid flow.

Next, an operation of the physical quantity measurement device according to the present embodiment will be described.

The fluid to be measured flowing through main channel 201 flows in through inlet 202 as indicated by white arrow Y in FIG. 5. Most of the fluid flowing through main channel 201 becomes flow Fm, and finally flows out through outlet 203 as indicated by black arrow Z in FIG. 5.

At inlet opening 205 where inflow direction regulator 213 is disposed, each of a plurality of plate-shaped or louver-shaped guide pieces 212 of inflow direction regulator 213 has angle θ set to a value that is greater than 90 degrees with respect to the flow direction of the fluid in main channel 201. With this, even when the fluid to be measured in main channel 201 contains fine droplets such as water droplets, the droplets collide with guide pieces 212 and drop or adhere to guide pieces 212, preventing the droplets from flowing into sub-channel 207. Moreover, with respect to foreign substances such as dust, the same advantageous effects as those for droplets can be obtained by collision with guide pieces 212 and dropping or the like.

Guide pieces 212 are configured to satisfy the relation of H>h where h is a distance between adjacent guide pieces 212 and H is a height of main channel 201. With this configuration, when the fluid passes louver-shaped guide pieces 212, large-scale vortices and turbulence generated in the fluid flowing through main channel 201 becomes smaller. Moreover, the turbulence of the fluid flow in sub-channel 207 is smaller than the turbulence of the fluid flow in main channel 201.

In this way, droplets such as water droplets are substantially removed from the fluid to be measured and the turbulence of the flow is reduced, so that the disturbance of the signal generated when ultrasonic waves are transmitted and received between ultrasonic transmitter 208 and receiver 209 can be reduced. With this, the sound velocity of the fluid to be measured can be stably measured by using the pair of ultrasonic transmitter 208 and receiver 209. Signal processor 211 calculates the concentration of a component contained in the fluid to be measured by a known method using the sound velocity thus obtained and the temperature of the fluid measured by temperature sensor 210.

In this way, in sub-channel 207, it is possible to significantly reduce the mixture of droplets such as water droplets and foreign substances into the fluid to be measured flowing through sub-channel 207, and to achieve a fluid flow state with a small turbulence. Accordingly, in the physical quantity measurement device which includes sub-channel 207, even when a measurement method is used which is influenced by droplets such as fine water droplets contained in the fluid to be measured or which is influenced by the turbulence of the flow of the fluid to be measured, it is possible to reduce the influences and increase the accuracy of measurement such as the concentration measurement of a component contained in the fluid to be measured. Moreover, in the physical quantity measurement device thus configured, since the cross section of main channel 201 is not reduced in size, no particular pressure loss is generated in the fluid flowing through main channel 201.

Moreover, by arranging the pair of ultrasonic transmitter 208 and receiver 209 so as to oppose to each other along the direction of the flow of the fluid in sub-channel 207 (that is, on the upstream side and on the downstream side), the length of the straight portion of sub-channel 207, which is the propagation distance of ultrasonic waves, can be increased in accordance with the required measurement accuracy. In addition, the flow rate measurement using a propagation time reciprocal difference method can also be performed.

Figure 7:
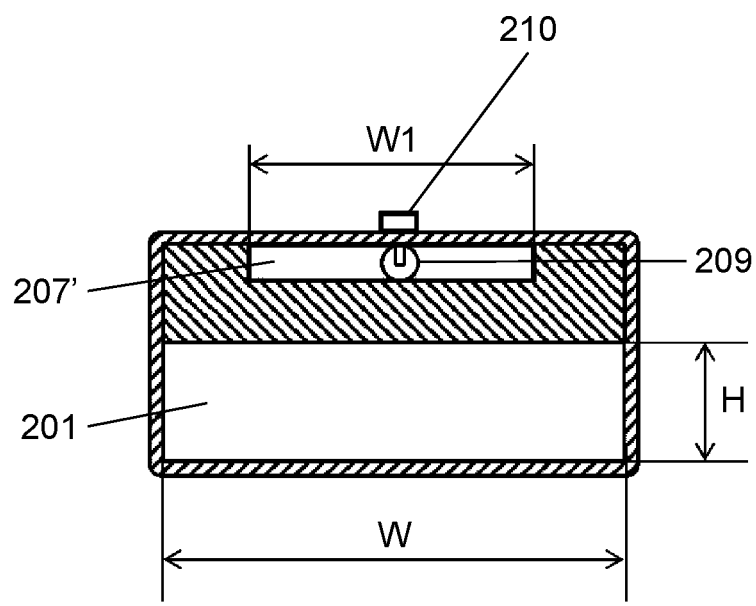
FIG. 7 illustrates another shape of a cross section taken along line A-A of FIG. 5.
Figure 8:
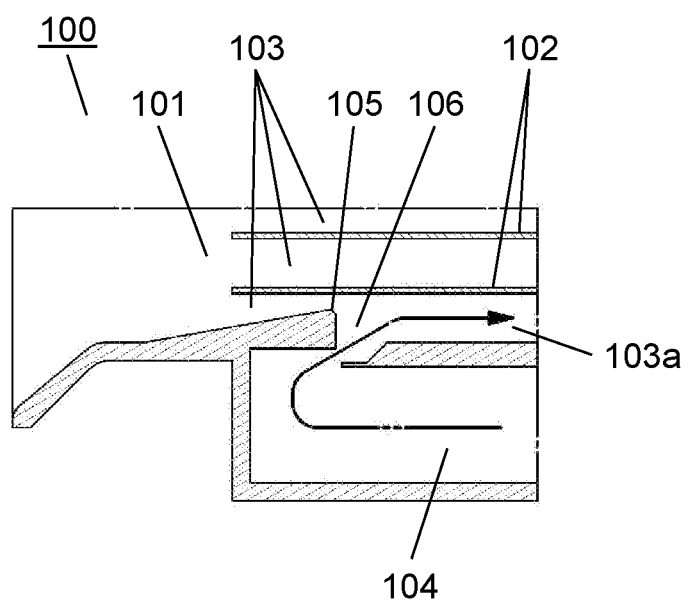
FIG. 8 is a partial cross-sectional view illustrating a configuration of a measurement channel of a component measurement unit included in an ultrasonic flowmeter according to a conventional technique.

Although it has been described in the third embodiment that, as illustrated in FIG. 6, the width of sub-channel 207 (depth direction of FIG. 5) is equal to width W of main channel 201, the present disclosure is not limited to such an example. FIG. 7 illustrates another shape of a cross section taken along line A-A line of FIG. 5. For example, as illustrated in FIG. 7, sub-channel 207' with width W1 that is narrower than width W may be disposed in place of sub-channel 207.

Moreover, although it has been described in the third embodiment that the cross-sectional shape of main channel 201 is rectangle, the physical quantity measurement device according to the present disclosure is not limited to such an example. The cross-sectional shape of main channel 201 may be a shape other than a rectangle such as a circle. When the cross-sectional shape of main channel 201 is circle and the diameter of the circle is D, the relation between diameter D and distance h that is a distance between adjacent guide pieces 212 satisfies D>h.

Moreover, although it has been described in the third embodiment that temperature sensor 210 is disposed in sub-channel 207, temperature sensor 210 may be disposed in main channel 201.

Moreover, although it has been described in the third embodiment that the physical quantity measurement device is a device for measuring a component of the fluid, the physical quantity measurement device according to the present disclosure is not limited to such an example. The physical quantity measurement device may be a flowmeter in which a flow rate measurement unit is disposed in series with the upstream side or the downstream side of main channel 201, or a flowmeter in which a flow rate measurement unit is disposed in parallel with main channel 201 including sub-channel 207.

Moreover, it has been described in the third embodiment that the component concentration measurement unit includes the pair of ultrasonic transmitter 208 and receiver 209, temperature sensor 210, and signal processor 211. However, the physical quantity measurement device according to the present disclosure is not limited to such an example. The physical quantity measurement device according to the present disclosure may include a heat flow sensor in place of the ultrasonic transmitter and receiver and the temperature sensor. Alternatively, a sensor capable of measuring the concentration of a specific gas, for example, a hydrogen sensor, may be used.

As described above, a physical quantity measurement device according to a first disclosure includes: a main channel through which a fluid to be measured flows; an inlet opening and an outlet opening which are provided in a channel wall of the main channel; a sub-channel which connects the inlet opening and the outlet opening; an inflow direction regulator which is disposed at the inlet opening; a chamber portion which is disposed in the sub-channel; a pair of ultrasonic transmitter and receiver which are disposed in the chamber portion; a temperature sensor which detects a temperature of the fluid; and a signal processor which calculates a concentration of a component contained in the fluid in response to a signal from the pair of ultrasonic transmitter and receiver and a signal from the temperature sensor. The inflow direction regulator includes a guide piece which is inclined at a predetermined angle with respect to a flow direction of the fluid in the main channel. The predetermined angle is set to a value that is greater than 90 degrees in relation to the flow direction of the fluid in the main channel. The chamber portion has a cross-sectional area that is greater than an effective cross-sectional area of the inlet opening. Even when the fluid to be measured contains droplets such as fine water droplets, the physical quantity measurement device thus configured is capable of supplying, to the sub-channel, the fluid in which the mixture of droplets such as water droplets is significantly reduced and the droplets are substantially removed. With this, even when the fluid to be measured contains fine water droplets and the like, the influence of such water droplets is significantly reduced, and the accuracy of measurement, such as concentration measurement of a component contained in the liquid can be increased. Moreover, since the inflow velocity of the fluid in the chamber portion that is disposed in the sub-channel can be reduced, the disturbance of the fluid flow generated in the main channel can be reduced. With this, it is possible to measure, in the sub-channel, the fluid to be measured in a state where the disturbance of the fluid flow is small. Moreover, the main channel of the physical quantity measurement device has a cross-sectional area that is not reduced in the portion where the fluid flowing through the main channel is led to the sub-channel. Hence, no particular pressure loss is generated in the fluid flowing through the main channel.

In the physical quantity measurement device according to a second disclosure, the main channel includes a main channel housing block which penetrates the main channel in the physical quantity measurement device according to the first disclosure. The sub-channel which connects the inlet opening and the outlet opening includes a sub-channel housing block which houses a sub-channel forming block. The inflow direction regulator is integrally formed with the sub-channel forming block. The sub-channel housing block which houses the sub-channel forming block is assembled to the main channel housing block. With such a configuration of the physical quantity measurement device, the size of the sub-channel can be further reduced, and the productivity at the time of the production of the physical quantity measurement device can be increased by reducing the step of providing, in the main channel, a device for measuring the physical quantity of fluid flowing the main channel. Moreover, a reduced number of components included in the physical quantity measurement device leads to a cost reduction at the time of producing the physical quantity measurement device.

A physical quantity measurement device according to a third disclosure includes: a main channel through which a fluid to be measured flows; an inlet opening and an outlet opening which are provided in a channel wall of the main channel; a sub-channel which connects the inlet opening and the outlet opening; an inflow direction regulator which is disposed at the inlet opening; and a component concentration measurement unit which is disposed in the sub-channel.

The inflow direction regulator includes a plurality of guide pieces each of which is inclined at a predetermined angle with respect to a flow direction of the fluid in the main channel. The predetermined angle is set to a value that is greater than 90 degrees in relation to the flow direction of the fluid in the main channel, and a relation between a distance h and a height H satisfies H>h where the distance h is a distance between adjacent ones of the plurality of guide pieces and the height H is a height of the main channel. Even when the fluid to be measured contains droplets such as fine water droplets, the physical quantity measurement device thus configured is capable of supplying, to the sub-channel, the fluid in which the mixture of droplets such as water droplets is significantly reduced and which contains substantially no droplets. With this, it is possible to significantly reduce the influence of droplets and the like, and to increase the accuracy of measurement such as the concentration measurement of a component contained in the fluid. Moreover, by dividing the fluid flow by louver-shaped guide pieces, it is possible to reduce the disturbance of the flow of the fluid generated in the main channel. With this, it is possible, in the sub-channel, to measure the fluid to be measured in a state where the disturbance of the fluid flow is small. Moreover, in the physical quantity measurement device, the cross-sectional area of the main channel is not reduced in the portion where the fluid flowing through the main channel is led to the sub-channel. Hence, no particular pressure loss is generated in the fluid flowing through the main channel.

In the physical quantity measurement device according to a fourth disclosure, the component concentration measurement unit includes: a pair of ultrasonic transmitter and receiver which are disposed in the sub-channel; a temperature sensor which detects a temperature of the fluid; and a signal processor which calculates a concentration of a component contained in the fluid in response to a signal from the pair of ultrasonic transmitter and receiver and a signal from the temperature sensor, particularly in the physical quantity measurement device according to the third embodiment.

In the physical quantity measurement device according to a fifth disclosure, the component concentration measurement unit includes: a heat flow sensor which is disposed in the sub-channel; and a signal processor which calculates a concentration of a component contained in the fluid in response to a signal from the heat flow sensor, particularly in the physical quantity measurement device according to the third disclosure.

INDUSTRIAL APPLICABILITY

As described above, the present disclosure provides a physical quantity measurement device which is capable of preventing droplets from entering the sub-channel, supplying a stable fluid flow with a small disturbance to the sub-channel, and generating little pressure loss in the main channel. With this, it is possible to provide a flowmeter, which includes not only a measurement device which measures a component of fluid but also a flow rate measurement unit disposed next to the measurement device, with a high measurement accuracy and high general versatility.

REFERENCE MARKS IN THE DRAWINGS 1 main channel
2 inlet
3 outlet
4 channel wall
5 inlet opening
6 outlet opening
7 sub-channel
7a chamber portion
7b channel portion
8, 9 ultrasonic transmitter and receiver
10 temperature sensor
11 signal processor
12 guide piece
13 inflow direction regulator
14 main channel housing block
14a inlet connector
14b outlet connector
14c sub-channel mounting portion
14d temperature sensor mounting portion
15 sub-channel housing block
15a ultrasonic transmitter mounting portion
15b signal processor mounting portion
16 packing
17 sub-channel forming block
18 protection block
100 measurement channel
101 main channel
102 partition plate
103 multilayer channel
103a multilayer channel
104 sub-channel
105 protruding portion
106 outlet
201 main channel
202 inlet
203 outlet
204 channel wall
205 inlet opening
206 outlet opening
207 sub-channel
208, 209 ultrasonic transmitter and receiver (component concentration measurement unit)
210 temperature sensor (component concentration measurement unit)
211 signal processor (component concentration measurement unit)
212 guide piece
213 inflow direction regulator

The invention claimed is:

1. A physical quantity measurement device comprising:
a main channel through which a fluid to be measured flows;
an inlet opening and an outlet opening which are provided in a channel wall of the main channel;
a sub-channel which connects the inlet opening and the outlet opening;
an inflow direction regulator which is disposed in the inlet opening;
a chamber portion which is disposed in the sub-channel;
a pair of ultrasonic transmitter and receiver which are disposed in the chamber portion;
a temperature sensor which detects a temperature of the fluid; and
a signal processor which calculates a concentration of a component contained in the fluid in response to a signal from the pair of ultrasonic transmitter and receiver and a signal from the temperature sensor,
wherein the inflow direction regulator includes a plurality of plate-shaped or louver-shaped guide pieces, each of the plurality of plate-shaped or louver-shaped guide pieces is inclined at a predetermined angle with respect to a flow direction of the fluid in the main channel, the predetermined angle is set to have a value that is greater than 90 degrees in relation to the flow direction of the fluid in the main channel, and the chamber portion has a cross-sectional area that is greater than an effective cross-sectional area of the inlet opening.

2. The physical quantity measurement device according to claim 1, further comprising a main channel housing block; and a sub-channel housing block which houses a sub-channel forming block, wherein the main channel penetrates the main channel housing block, the sub-channel is in the sub-channel forming block, the inflow direction regulator is integrally formed with the sub-channel forming block, and the sub-channel housing block which houses the sub-channel forming block is assembled to the main channel housing block.

3. A physical quantity measurement device comprising:

a main channel through which a fluid to be measured flows;

an inlet opening and an outlet opening which are provided in a channel wall of the main channel;

a sub-channel which connects the inlet opening and the outlet opening;

an inflow direction regulator which is disposed in the inlet opening; and a component concentration measurement unit which is disposed in the sub-channel, wherein the inflow direction regulator includes a plurality of plate-shaped or louver-shaped guide pieces, each of the plurality of plate-shaped or louver-shaped guide pieces is inclined at a predetermined angle with respect to a flow direction of the fluid in the main channel, the predetermined angle is set to a value that is greater than 90 degrees in relation to the flow direction of the fluid in the main channel, and a relation between a distance h and a height H satisfies H>h, the distance h being a distance between adjacent ones of the plurality of guide pieces, the height H being a height of the main channel.

4. The physical quantity measurement device according to claim 3, wherein the component concentration measurement unit includes:

a pair of ultrasonic transmitter and receiver which are disposed in the sub-channel;

a temperature sensor which detects a temperature of the fluid; and a signal processor which calculates a concentration of a component contained in the fluid in response to a signal from the pair of ultrasonic transmitter and receiver and a signal from the temperature sensor.

5. The physical quantity measurement device according to claim 3, wherein the component concentration measurement unit includes:

a heat flow sensor which is disposed in the sub-channel; and a signal processor which calculates a concentration of a component contained in the fluid in response to a signal from the heat flow sensor.

* * * * *